US012565407B2

(12) United States Patent
Ibrahim

(10) Patent No.: US 12,565,407 B2
(45) Date of Patent: Mar. 3, 2026

(54) PNEUMATIC LOAD BALANCING SYSTEM AND METHOD

(71) Applicant: STACCATO TECHNOLOGIES AB, Haninge (SE)

(72) Inventor: Twana Ibrahim, Stockholm (SE)

(73) Assignee: STACCATO TECHNOLOGIES AB, Haninge (SE)

( * ) Notice: Subject to any disclaimer, the term of this patent is extended or adjusted under 35 U.S.C. 154(b) by 283 days.

(21) Appl. No.: 18/263,598

(22) PCT Filed: Feb. 25, 2022

(86) PCT No.: PCT/SE2022/050196

§ 371 (c)(1), (2) Date: Jul. 31, 2023

(87) PCT Pub. No.: WO2022/197229

PCT Pub. Date: Sep. 22, 2022

(65) Prior Publication Data

US 2024/0083720 A1 Mar. 14, 2024

(30) Foreign Application Priority Data

Mar. 19, 2021 (SE) .................................... 2150317-2
Mar. 19, 2021 (SE) .................................... 2150318-0

(51) Int. Cl.
*B66D 5/26* (2006.01)
*B66D 1/48* (2006.01)

(52) U.S. Cl.
CPC ............... *B66D 1/485* (2013.01); *B66D 5/26* (2013.01); *B66D 2700/0133* (2013.01)

(58) Field of Classification Search
CPC ... B66D 1/08; B66D 1/12; B66D 1/36; B66D 1/44; B66D 1/46; B66D 1/60; B66D 3/18;

(Continued)

(56) References Cited

U.S. PATENT DOCUMENTS 3,537,686 A 11/1970 Mckendrick
3,747,886 A * 7/1973 Carlson ................ B66C 23/005 414/730

(Continued)

FOREIGN PATENT DOCUMENTS

CA 2359770 C * 8/2002 ............... B66D 1/48
CA 2594269 A1 * 1/2009 ............ B25J 9/1065

(Continued)

OTHER PUBLICATIONS

International Search Report for PCT/SE2022/050196 mailed May 5, 2022, 6 pages.

(Continued)

*Primary Examiner* — Anna M Momper
*Assistant Examiner* — Henrix Soto
(74) *Attorney, Agent, or Firm* — NIXON & VANDERHYE P.C.

(57) ABSTRACT

A pneumatic load balancing system comprises a pressure sensor for determining the pressure in a chamber of the actuating cylinder, and a controller for controlling the air pressure in the chamber of the actuating cylinder via at least one air supply valve. The controller is configured to during a load balancing sequence continuously or periodically obtain a current air pressure in the chamber from the pressure sensor when supplying air to the chamber via said at least one air supply and to determine a balancing air pressure in the chamber when, if air fed to the chamber, the air pressure stops increasing or when the gradient of the pressure increase is below a pre-determined threshold value; or if the air pressure is let out from the chamber, the air pressure starts to decrease. The balancing air pressure thus determined is then used as the balancing air pressure for the actuating cylinder of the pneumatic load balancing system. Hereby an automatic setting of the air pressure required for (Continued)

load balancing can be achieved. The user does then not need to manually feed the required air-pressure and the system will use the correct air-pressure and mistakes in setting of the air pressure can be avoided.

19 Claims, 10 Drawing Sheets

(58) Field of Classification Search
CPC ... B66D 3/20; B66D 5/18; B66D 5/26; B66D 2700/0133; B66D 2700/035; B66C 23/005
USPC .......................................................... 254/264
See application file for complete search history.

(56) References Cited

U.S. PATENT DOCUMENTS

| | | | |
|---|---|---|---|
| 3,758,079 A | | 9/1973 | Workman et al. |
| 4,500,074 A | | 2/1985 | Fox et al. |
| 5,456,130 A | | 10/1995 | Pierson et al. |
| 5,481,959 A | | 1/1996 | Watanabe et al. |
| 8,105,008 B2 | * | 1/2012 | Givens .................. B66C 23/005 414/744.3 |
| 9,334,915 B2 | * | 5/2016 | Polzer .................... F16M 13/02 |
| 9,650,232 B2 | * | 5/2017 | Sugano .................... B66D 1/44 |
| 10,641,397 B2 | | 5/2020 | Bjerrehorn |
| 2001/0045549 A1 | | 11/2001 | Johnson |
| 2010/0212305 A1 | | 8/2010 | Runesson et al. |
| 2019/0160676 A1 | | 5/2019 | Harada |

FOREIGN PATENT DOCUMENTS

| | | | | |
|---|---|---|---|---|
| CN | 107445062 | | | 12/2017 |
| CN | 110182707 | A | | 8/2019 |
| DE | 102019202605 | A1 | | 8/2020 |
| JP | H07101700 | A | * | 4/1995 |
| JP | 11147698 | A | * | 6/1999 |
| JP | 11292500 | A | * | 10/1999 |
| JP | 2000309500 | A | * | 11/2000 |
| JP | 2006-290556 | | | 10/2006 |
| JP | 2007-062946 | | | 3/2007 |
| JP | 2007-091439 | | | 4/2007 |
| JP | 2009-166995 | | | 7/2009 |
| JP | 2009155018 | A | * | 7/2009 |
| JP | 2010065812 | A | * | 3/2010 |
| JP | 5198728 | | | 5/2013 |
| KR | 200354022 | Y1 | | 6/2004 |
| KR | 20080102787 | A | * | 11/2008 |

OTHER PUBLICATIONS

Written Opinion of the ISA for PCT/SE2022/050196 mailed May 5, 2022, 9 pages.

* cited by examiner

PNEUMATIC LOAD BALANCING SYSTEM AND METHOD

CROSS-REFERENCE TO RELATED APPLICATIONS

This application is the U.S. national phase of International Application No. PCT/SE2022/050196 filed Feb. 25, 2022, which designated the U.S. and claims priority to SE 2150317-2 filed Mar. 19, 2021, and SE 2150318-0 filed Mar. 19, 2021, the entire contents of each of which are hereby incorporated by reference.

TECHNICAL FIELD

The invention relates to a pneumatic system for balancing a weight and related devices and methods.

BACKGROUND

Lifting operations in industries often requires balancing of the lifted load. Conventional balancing devices also referred to as hoists, are generally characterized by a pressure fluid operated motor including a piston disposed in an expansible chamber and suitably connected to a rotatable cable drum. A load attached to the hoist cable is raised, lowered, or held in balance by controlling the pressure of the fluid admitted to the hoist chamber and acting on the piston. Such hoists are operable to provide for manual raising and lowering of a balanced load with minimum effort by regulating fluid pressure acting on the piston to a value sufficient to offset the weight of the load. The hoist operator is thereby able to manipulate the load, including raising and lowering it, with a force which is a mere fraction of the actual weight of the load.

Existing systems for providing a balancing of a load/weight includes U.S. Pat. No. 3,758,079 which describes a control system for a fluid operated balancing hoist which is operable to provide for raising, lowering, and automatically balancing a load of any weight up to the capacity of the hoist proper. The system has a control circuit having a pressure regulating valve which is operable to sense the pressure in the hoist motor chamber required to balance the load and automatically adjust itself to maintain the balance pressure value loads of varying weights. The control circuit includes a pressure regulator which automatically senses the balance pressure and is operable to be positively locked at the balance pressure setting.

Another example is U.S. Pat. No. 4,500,074 which also describes a system for balancing a load.

There is a constant need to improve load balancing systems in respect of accuracy, speed, and user-friendliness. Hence, there exists a need for an improved load balancing system and a method for controlling such a load balancing system.

SUMMARY

It is an object of the present invention to provide an improved control and or functioning of a pneumatic load balancing system.

This object is obtained by the devices and methods as set out in the appended claims.

In accordance with the invention, a pneumatic load balancing system comprising an actuating cylinder for balancing a load is provided. The pneumatic load balancing system comprises a pressure sensor for determining the pressure in a chamber of the actuating cylinder, and a controller for controlling the air pressure in the chamber of the actuating cylinder via at least one air supply valve. The controller is configured to during a load balancing sequence continuously or periodically obtain a current air pressure in the chamber from the pressure sensor when supplying air to the chamber via said at least one air supply and to determine a balancing air pressure in the chamber when, if air fed to the chamber, the air pressure stops increasing or when the gradient of the pressure increase is below a pre-determined threshold value; or if the air pressure is let out from the chamber, the air pressure starts to decrease (or at a rate above some threshold value). The balancing air pressure thus determined is then used as the balancing air pressure for the actuating cylinder of the pneumatic load balancing system. Hereby an automatic setting of the air pressure required for load balancing can be achieved. The user does then not need to manually feed the required air-pressure and the system will use the correct air-pressure and mistakes in setting of the air pressure can be avoided. The term supply can refer to both feeding air or letting air out from the chamber.

In accordance with one embodiment, the pressure in the chamber is first set to an initial value before starting to continuously or periodically obtain a current air pressure in the chamber. In particular the initial value can be set to the ambient pressure when air is fed to the chamber or a system pressure (maximum system pressure) when air is let out from the chamber. Hereby a robust automatic setting sequence for the balancing air pressure is obtained.

In accordance with one embodiment, the pneumatic load balancing system is configured to supply air at a constant rate when supplying air to the chamber. Hereby the determination of when the increase rate stops/reduces is easy to find and can be determined more precisely.

In accordance with one embodiment, a position sensor is provided to determine the position of the cylinder, and the controller is configured to use the position sensor output signal to determine the balancing pressure. By also using the position of the cylinder or more accurate determination of the balancing pressure can be obtained. Also, malfunction of the automatic balancing pressure can be determined.

In accordance with one embodiment, the pneumatic load balancing system is configured to initiate the load balancing sequence based in an initiation signal. Hereby the system can be set to trigger the automatic sequence for determining the balancing pressure at any suitable time. In particular the initiation signal can be a user command signal.

In accordance with another aspect of the invention, pneumatic load balancing system comprising an actuating cylinder for balancing a load connected to the actuating cylinder is provided. The pneumatic load balancing system comprises a pressure sensor for determining the pressure in a chamber of the actuating cylinder, and a controller for controlling the air pressure in the chamber of the actuating cylinder via at least one air supply valve. The controller is configured to continuously or periodically obtain a current air pressure in the chamber from the pressure sensor, and to determine a decrease in pressure to a pressure below balancing pressure. Based on the determined pressure decrease the controller can-determine that an accident event has occurred. Hereby it is enabled to take appropriate action required when an accident has occurred such as issuing a warning signal.

In accordance with one embodiment, activity of the at least one air supply valve is continuously or periodically monitored and the controller is configured to determine that an accident event has occurred based on the valve activity.

Hereby a more robust determination of an accident event is enabled since the valve activity can be used to provide additional information that is helpful in determining that an accident event is present.

In accordance with one embodiment, the pneumatic load balancing system comprises a position sensor to determine the position of the cylinder, and the controller is configured to use the position sensor output signal to determine that an accident event has occurred. This also enables a more robust determination of an accident event is enabled since the position can be used to provide additional information that is helpful in determining that an accident event is present.

In accordance with one embodiment, the accident event can be determined to be a load being detached from the actuating cylinder.

In accordance with one embodiment, the controller is configured to apply a predetermined setting for at least one air supply valve when an accident event has been determined. Hereby negative results of the accident event can be prevented or at least reduced. For example, the predetermined setting can comprise to close a valve used for increasing the balancing pressure. Hereby the pressure in the actuating cylinder will not increase and the actuating cylinder can be prevented from providing an increased force that could cause damage to the load balancing system of the surroundings thereof. In another embodiment the predetermined setting comprises to open a valve used for decreasing the balancing pressure.

In accordance with one embodiment, the controller is configured to determine a decrease in pressure to a pressure below balancing pressure when the pressure is below a preset threshold value. Hereby a robust limit is provided.

In accordance with one embodiment, the controller is configured to apply a predetermined setting based on a position obtained from a position sensor. The controller is configured to store the position of the actuating cylinder, when the accident event is detected, and then control the position of the actuating cylinder in to the stored position. Hereby, when an accident event is detected the pneumatic load balancing system will strive to keep the actuating cylinder at a steady position when an accident event is detected. Hereby the risk for damage can be reduced in that the actuating cylinder can be prevented from moving. The control can be made in a closed loop.

In accordance with one embodiment, when a position sensor for determining the position of the actuating cylinder is provided, wherein controller is configured to continuously or periodically obtain the position of the actuating cylinder using output from the position sensor and to determine if the actuating cylinder is outside an allowed range. When it is determined that the actuating cylinder is outside the allowed range the controller is configured to drive the actuating cylinder towards the allowed range. Hereby additional safety can be added to the pneumatic load balancing system that prevents the pneumatic load balancing system from operating the actuating cylinder outside a safe range.

The invention also extends to methods for operating a pneumatic load balancing system in accordance with the above.

BRIEF DESCRIPTION OF THE DRAWINGS

The invention will now be described in more detail, by way of example, and with reference to the accompanying drawings, in which.

DETAILED DESCRIPTION

The invention will now be described more fully hereinafter with reference to the accompanying drawing, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, like or similar components of different embodiments can be exchanged between different embodiments. Some components can be omitted from different embodiments. Like numbers refer to like elements throughout the description.

Figure 1:
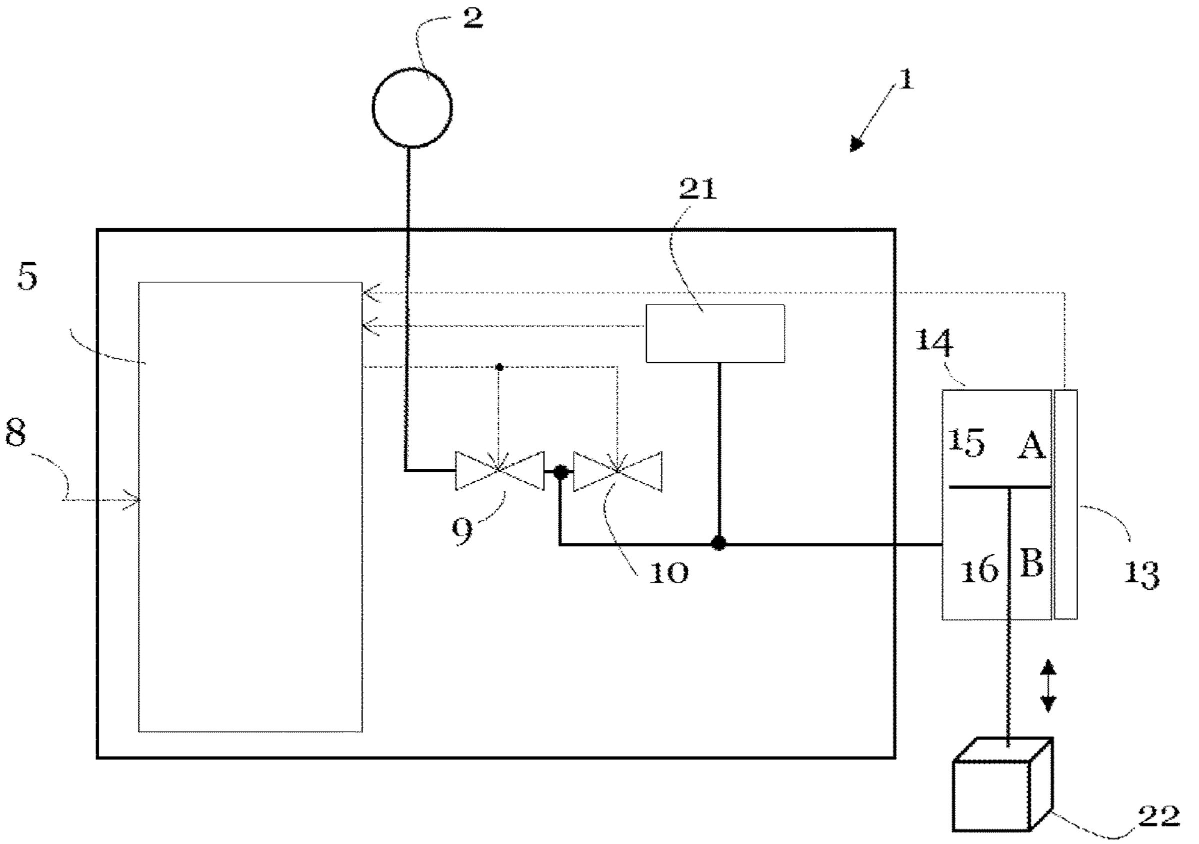
FIG. 1 illustrates a load balancing system.

In FIG. 1, a pneumatically driven cylinder 14 is controlled by a load balancing system 1 is illustrated. The pneumatic cylinder 14 can be configured to operate as an actuator (an actuating cylinder) to lift a weight 22 of some kind. It is also envisaged that some other load than a weight 22 is connected to the load balancing system 1. The load balancing system 1 is fed with air from an air-supply 2 and the cylinder 14 is controlled by the load balancing system 1 as will now be described in conjunction with the exemplary load balancing system 1 of FIG. 1.

The pneumatic cylinder 14 comprises a first chamber 15 with pressure A and a second chamber 16 with pressure B. The two chambers 15 and 16 are located on different sides of the cylinder 14 (typically on different sides of the cylinder head of the cylinder 14). In the exemplary embodiment of FIG. 1, the chamber 16 is pressurized (and depressurized) by an arrangement comprising a set of valves 9, 10. The valves can for example be valves similar to the valve described in U.S. Pat. No. 10,641,397 B2, but the valves can be any kind of valve suitable to be used in a pneumatic load balancing system. Also, while the valves 9,10 are shown as two valves in the exemplary embodiment of FIG. 1, any number of valves are envisaged. For example, the chamber 15 can also be pressurized (and depressurized) by a supplementary valve arrangement.

The cylinder actuation is controlled by pressurizing (and depressurizing) the cylinder chamber 16. In other words, air is supplied to the chamber 16 by feeding air to the chamber 16 or letting air out from the chamber 16. Hereby a balancing force is achieved that can balance the weight of the weight 22 connected to the actuating cylinder 14.

In the load balancing system of FIG. 1, the force applied by the cylinder 14 is controlled by a controller 5. The controller controls the airflow via the valves 9, 10. The valves 9,10 can be supplied with air via the air supply 2. The air supply 2 can be referred to as the system air pressure and sets an upper limit for the maximum air pressure that can be reached in the chamber 16. By controlling the pressure in the cylinder chamber 16, the force applied to the weight 22 can be controlled to balance the weight of the weight 22. The control can typically be performed by increasing the pressure in the chamber 16 by opening the valve 9 to let air into the chamber 16. Similarly, the valve 10 can be used to decrease the pressure in the chamber 16 by letting air out from the chamber 16.

The load balancing system 1 can in accordance with some embodiments be provided with a pressure sensor 21 that outputs the current pressure in the cylinder. In particular the pressure in chamber 16 that is pressurized/depressurized can be sensed by the pressure sensor 21. Also, a position sensor 13 can be provided to output a current position of the cylinder 14. The output from the pressure sensor 21 and/or the output from the position sensor 13 can be supplied to the controller 5.

The controller 5 can also receive a control input signal 8 from some external source, such as an operator operating the load balancing system. The control input signal can for example be a signal to lift or lower the weight 22.

For example, assuming that the weight 22 is balanced by the pressure in chamber 16, if a lift signal is received as the control input signal 8, the controller can activate valve 9 to increase the pressure in the chamber 16. Hereby the force applied on the weight 22 by the cylinder 14 will increase and the weight 22 will start moving upwards in the system of FIG. 1. If on the other hand a lowering signal is received as the control input signal 8, the controller can activate valve 10 to decrease the pressure in the chamber 16. Hereby the force applied on the weight 22 by the cylinder 14 will decrease and the weight 22 will start moving downwards in the system of FIG. 1.

The controller 5 can use the position sensor 13 to control the position of actuating cylinder 14 in a closed loop. A desired position of actuating cylinder 14 can then be stored by the controller 5. If a current position from position sensor 13 is determined to be outside the stored desired value (or outside a range around the stored desired value), the controller 5 can activate valve 9 or 10 to adjust the pressure B. Using this principle, the controller 5 can control the actuating cylinder 14 to hold a stored position.

During balancing of the weight 22, pressure B of the cylinder 14 (i.e., the pressure in chamber 16) is adjusted to correspond to the weight of weight 22. Pressure B will then apply a force that is equal to the gravitational force on weight 22. This pressure level for pressure B can be referred to as a balancing pressure. In practice, this can be obtained by storing the required pressure to balance weight 22 in controller 5. Controller 5 can compare the required pressure to balance weight 22 with the pressure B obtained from pressure sensor 21. If pressure B is lower than the required pressure to balance weight 22, valve 9 is activated to increase pressure. If pressure B is lower than the required pressure to balance weight 22, valve 10 is activated to reduce pressure.

If, still assuming that the weight 22 is balanced by the pressure B in chamber 16, an operator applies a force in the upward direction on the weight 22, the pressure in chamber 16 will decrease. The pressure decrease in chamber 16 will be detected by the pressure sensor 21. The controller will activate valve 9 that compensates the pressure decrease. The weight 22 will move upwards. This function enables the weight 22 to be manipulated upward and downward by an operator, using only a fraction of the force needed to lift the weight 22.

Figure 2:
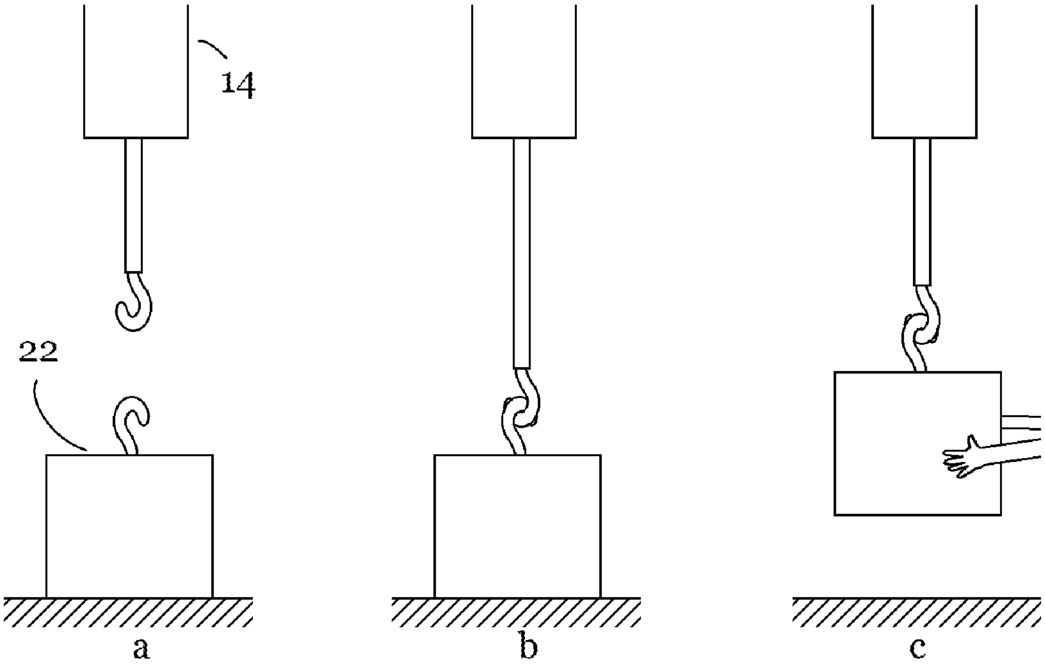
FIG. 2 illustrates a lift operation with a load balancing system.

In FIG. 2 a simple example of a lift operation is illustrated. First, at position a) of FIG. 2, a lifting device controlled by the pneumatic cylinder 14 is moved to the weight 22. The lifting device is here represented by a hook connected to the actuating cylinder 14. The weight 22 to be moved is then connected to the hook that is connected to the actuating cylinder 14 as is illustrated at b) of FIG. 2. A balancing pressure is then fed to the pneumatic actuating cylinder 14 so that the weight 22 is balanced. The weight 22 can then be moved up/down by an operator in an easy manner as is illustrated at c) of FIG. 2.

However, for the operation illustrated in FIG. 2 to work properly, the balancing force corresponding to the weight of the weight 22 must by applied by the actuating cylinder 14. Thus, a correct balancing force must be entered into the balancing system controlling the pneumatic cylinder 14. This force can for example be entered as a weight by the operator and the system then converts the weight into a pressure in the cylinder that gives the correct balancing force.

It would however be beneficial if the balancing system could automatically apply the correct balancing force.

In accordance with one embodiment, such an automatic setting of the balancing force can be obtained by monitoring the pressure in the cylinder chamber.

Figure 4:
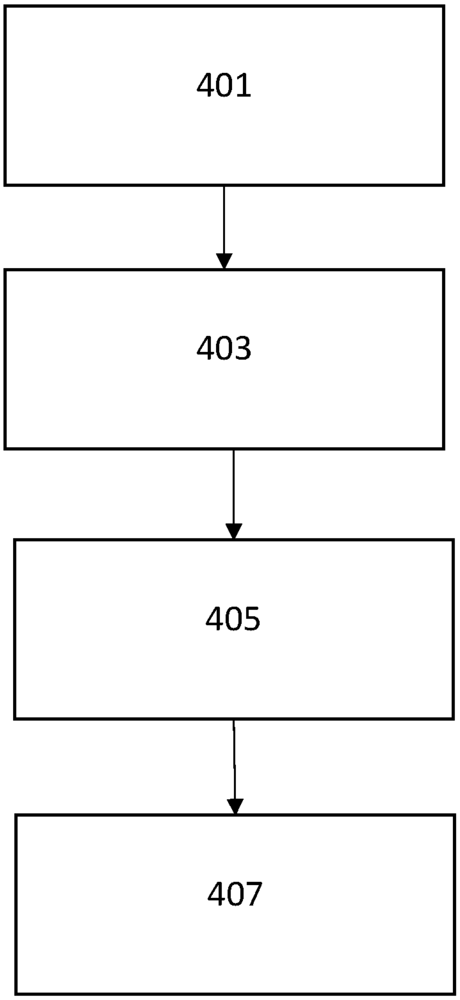
FIG. 4 is a flow chart illustrating steps performed when setting the balancing pressure.

The sequence in the flow chart of FIG. 4 describes how the balancing force can be obtained by ether monitoring the pressure B or the position of actuator 14. Typically, before the weight is connected to the actuator, the pressure in chamber 16 is set to an in initial value. The initial value is typically very low and can for example be zero or at least lower than a pressure corresponding to a lowest weight to be balanced by the actuating cylinder 14. In step 401, the pressure B is set at this initial value and the weight 22 is connected to the actuator 14.

The pressure B is then set to gradually increase in a step 403. The increase can in accordance with some embodiments be performed at a set rate. The gradual increase of pressure B at a set rate can be achieved by opening valve 9 at a constant flow rate. This step can be initiated by an operator using external signal 8 to indicate that it is desired to lift the weight 22.

The pressure is then continuously, or at least periodically, monitored by the load balancing system 1 via the output from the pressure sensor 21 in a step 405 while pressure is still set to gradually increase at a set rate.

Figure 3:
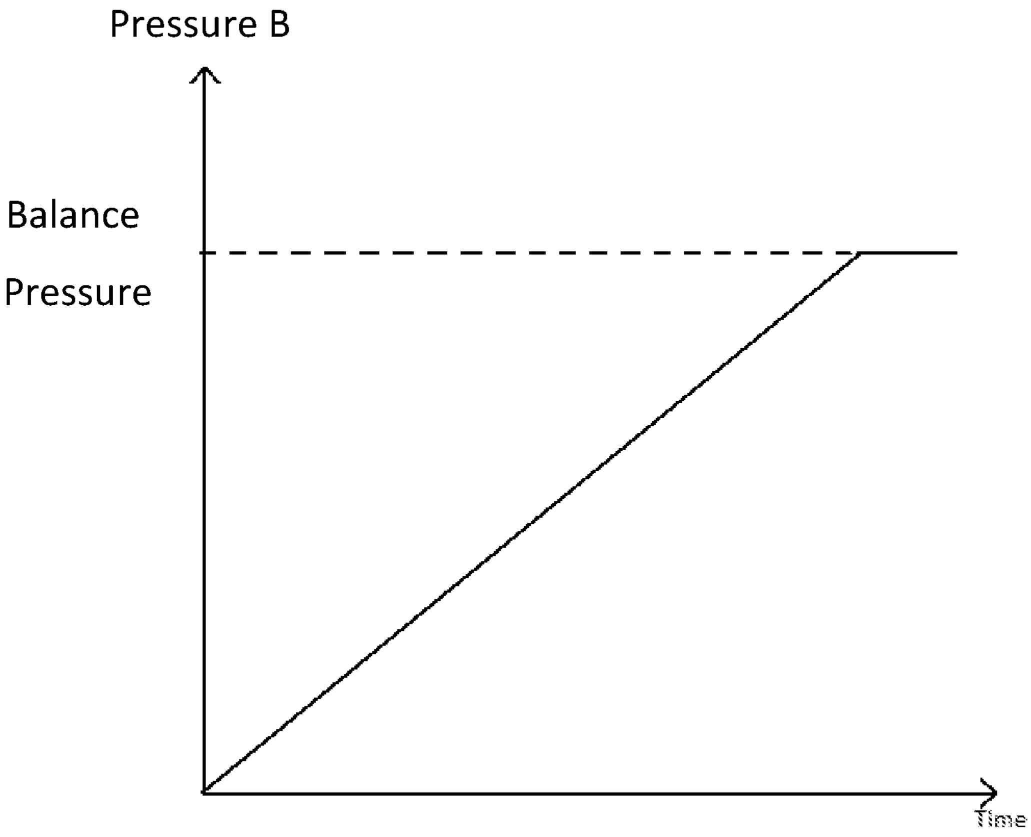
FIG. 3 is a diagram illustrating pressure increase during filling of air.

In a typical scenario, operating pressure, i.e., the air supply 2 can be set to 0.5 MPa. The weight of weight 22 can correspond to a pressure of 0.2 MPa in chamber 16. The gradual increase rate of pressure B can be set to 0 to 0.5 MPa/s. The increase rate of pressure B can be obtained by setting the flow of valve 9 at a constant flow rate. As long as pressure B is lower than the pressure required to lift weight 22, the flow from valve 9 will give a gradual increase of pressure B as can be seen in the diagram of FIG. 3.

When the pressure in chamber 16 reaches the pressure required to lift weight 22, the weight 22 will move upward. As a result, chamber 16 will expand in volume and the pressure gradient will significantly change. FIG. 3 illustrates how the pressure gradient significantly changes when pressure in chamber 16 reaches the pressure required to lift weight. Thus, when the air supplied to the chamber 16 via the valve shows that the pressure increase stops or at least significantly reduces in increase rate.

In accordance with another embodiment data from the position sensor 13 is used as an alternative or as a supplement to data from the pressure sensor 21 to automatically determine the balancing pressure required to obtain a balancing force in the actuating cylinder 14. In such an embodiment, when the pressure in chamber 16 reaches the pressure required to lift weight 22, and the weight 22 moves upward, the movement can be detected by position sensor 13. When a lift action is detected, the pressure is recorded and used as the balancing pressure.

In step 405, the controller 5 detects a (significant) change in pressure increase rate from pressure sensor 21 and or a movement from the output of position sensor 13. When such a pressure increase rate change and or a position change is detected, the pressure B is recorded in a step 407 and used as the pressure to balance the weight 22. The operator can then start using the load balancing system 1 and start moving the weight as in pre-existing systems with the balancing pressure set accordingly. Hereby an automatic balancing pressure setting can be obtained.

In an alternative embodiment, the sequence to find the balancing pressure is started at a high pressure and air is then let out from to chamber 16. In such a scenario the weight 22 will be lifted up by the high pressure and when the balancing pressure is reached as air is let out from the chamber 16, the pressure in the chamber will start to drop at a significant rate above some threshold value. This sequence can also be supplemented by recording a position from the position sensor 13 in accordance with the above. The initial pressure used when starting from a high pressure can for example be the air supply pressure 2 (system pressure) or some other high pressure above some pre-set value that ensures that the pressure in the chamber is above the balancing pressure when the sequence to find the balancing pressure starts.

Once, the weight 22 has been balanced and the operator has started to move the weight, there is a risk that an accident can occur if the weight 22 is accidentally dropped and the actuating cylinder is not stopped. In order to handle such an emergency situation, the load balancing system 1 as described herein can in accordance with some embodiments be adapted to continually or periodically record the pressure in the cylinder 14 and or the position of the cylinder 14 using data from the pressure sensor 21 and or position sensor 13, respectively.

An accident can for example occur if the weight 22 is dropped. The weight will then no longer pull against the pressure B in chamber 16. The arm of actuator 14 will move upward and chamber 16 will expand. This will give a reduction in pressure. During balancing, the reduction in pressure will be counter acted. This will give further fluid flow into chamber 16. The arm of actuator 14 will move upward and can then cause an accident. This is one example of an accident event that can occur when using the balancing system 1.

Figure 5:
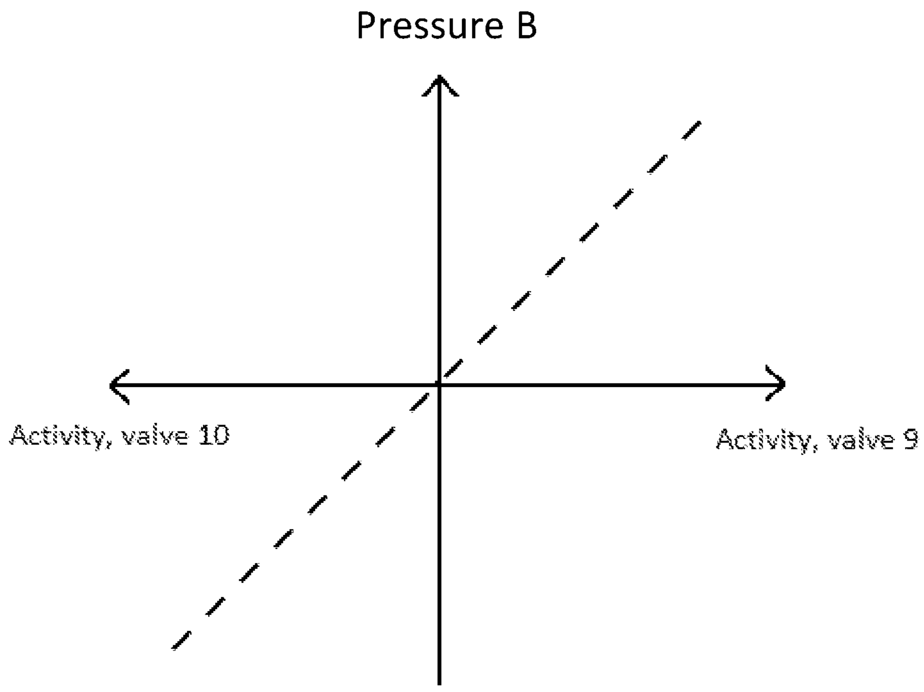
FIG. 5 illustrates balancing pressure manipulation.

As set out above, the controller 5 can be configured to record the pressure B of chamber 16, Typically, pressure B will be adjusted to balancing pressure by controller 5. An operator can apply a force on weight 22, this will result in a deviation from balancing pressure for pressure B. The deviation counter acted by controller 5. This will result in weight 22 moving in the direction of the force applied by the operator. The force applied by the operator is much smaller than force required to lift weight 22. Therefore, the deviation of pressure B from the balancing pressure is much smaller than the balancing pressure. FIG. 5 illustrates how the setting of the valves 9 and 10 can be used to control the balancing pressure B. Thus, opening of the valve 9 will act to increase the pressure B and opening of the valve 10 will act to decrease the pressure B.

Figure 6:
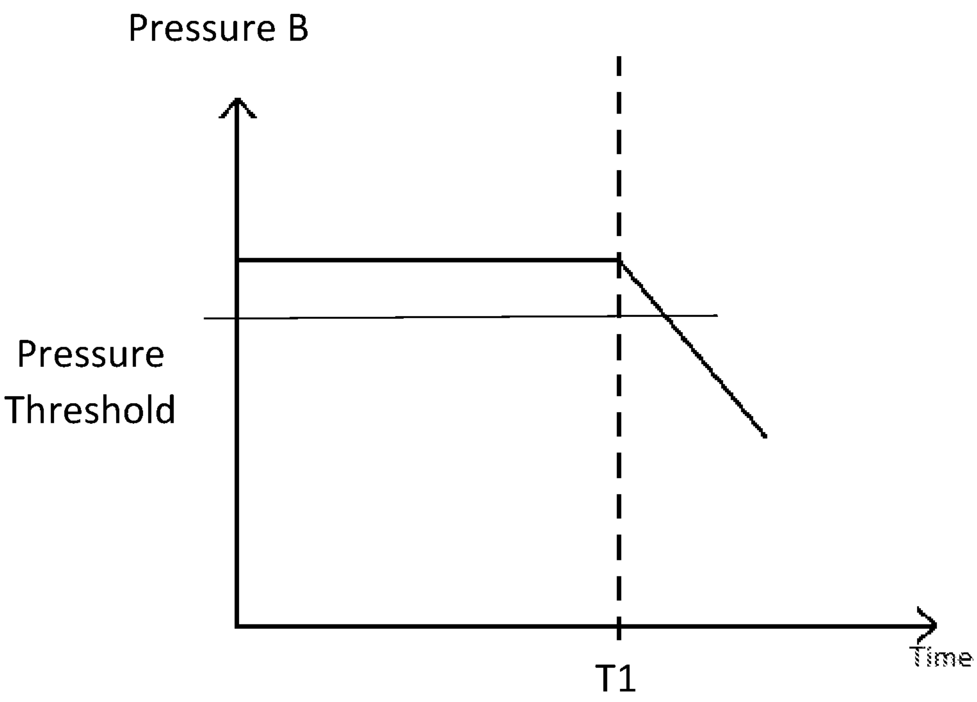
FIG. 6 is a diagram illustrating pressure as a function of time during balancing and if balanced weight is dropped.

FIG. 6 illustrates pressure B as a function of time if weight 22 is balanced. In the example, weight 22 is successfully balanced between time 0 and T1. At time T1, the weight 22 is dropped. x axis shows time, y axis shows pressure B. The line illustrates the balancing pressure of weight 22. Between time 0 and T1, when weight 22 is balanced by pressure B.

Between time 0 and time T1, pressure B is controlled to balancing pressure. Pressure B is monitored by controller 5 using signal from pressure sensor 21. If pressure B is lower than balancing pressure, valve 9 is activated by controller 5 giving an increase in pressure B. And if pressure B is higher than balancing pressure, valve 10 is activated by controller 5 giving a decrease in pressure B.

Typically, if no external force is applied to weight 22 pressure B will be stable. In this case, the difference between pressure B and balancing pressure will be very small. In this case, the recorded values in controller 5 will show, no valves active, no change in pressure B and no change in position of actuator 14.

An operator can apply a force in upward direction on weight 22, as a result pressure B will decrease. The decrease in pressure B will be detected by controller 5. Controller 5 will then activate valve 9, as a result pressure B will increase. The position of actuator 14 can be monitored by position sensor 13, then a position change in upward direction will be detected. In this case, the recorded values in controller 5 will show, valve 9 is active, a positive pressure gradient of pressure B and a position change of actuator 14 in upward direction.

An operator can apply a force in downward direction on weight 22, as a result pressure B will increase. The increase in pressure B will be detected by controller 5. Controller 5 will then activate valve 10, as a result pressure B will decrease. The position of actuator 14 can be monitored by position sensor 13, then a position change in downward direction will be detected. In this case, the recorded values in controller 5 will show, valve 10 is active, a negative pressure gradient of pressure B and a position change of actuator 14 in downward direction.

At time T1, when weight 22 is dropped. The weight of weight 22 will no longer pull actuator 14 in downward direction giving a rapid movement in upward direction of actuator 14. This will result in a decrease in pressure B. As a result, valve 9 will be activated, since weight 22 is no longer compressing chamber 16, pressure will not increase. In this case, the recorded values of controller 5 will show, decrease in pressure B considerably higher than typical conditions, valve 9 is active, negative pressure gradient of pressure B and position change of actuator 14 in upward direction.

To detect if the weight is dropped, a detection limit can be set as illustrated in FIG. 6. Actuator (cylinder 14) can be chosen so that the balancing pressure of weight 22 is set to a balancing pressure such as 0.2 MPa. Typically, during balancing the deviation of pressure B from balancing pressure is smaller than 0.0005 MPa. A detection limit is set that is higher than a normal deviation from the balancing pressure. In this example the detection limit can be set to 0.005 MPa.

In accordance with some embodiments, the controller 5 can detect negative pressure gradient of pressure B coupled with valve 9 active to detect if weight 22 is dropped. Hereby a more robust detection mechanism can be obtained.

In accordance with some embodiments, the controller 5 can detect pressure B lower than balancing pressure coupled with position change in upward detection. Hereby a more robust detection mechanism can be obtained.

Once the controller 5 has detected an accident event, for example due to that the actuator has dropped the weight 22, the information can be used to limit the movement of the system to prevent additional hazardous events. For example, the load balancing system can then be controlled to prevent an actuator piston to move. This can be done by deactivating (closing) valve 9 and or valve 10. This prevents movement of cylinder, as air is closed off in chamber 16. In accordance with another embodiment, the controller 5 can prevent movement of the actuator piston by deactivating valve 9 and activating valve 10. This will decrease pressure B, preventing upward movement of actuator 14. Thus, by controlling the valves 9, 10 to a pre-determined setting in response to a to a detected accident event, accidents can be avoided or limited.

Figure 7:
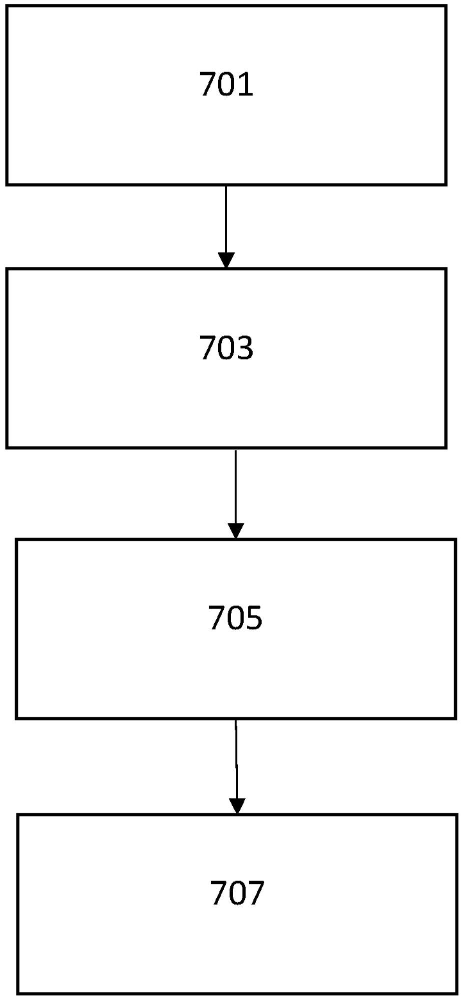
FIG. 7 is a flowchart illustrating some steps performed when detecting an accident event.

In FIG. 7 a flowchart illustrating steps performed when detecting an accident event is shown. First in a step 701 the system continuously or periodically obtains a current air pressure in the chamber from a pressure sensor. Next in a step 703 a decrease in pressure to a pressure below balancing pressure is determined. When a decrease in pressure to a pressure below balancing pressure is determined in step 703. For example, if the pressure is below a predetermined threshold value a decrease in pressure can be determined. Hereby noise and normal operation of the system will not trigger a determination that the pressure is decreased. The system determines that an accident event has occurred based on the determined decrease in pressure in a step 705. In addition to base the decision that an accident event has occurred on a decrease in pressure, the system can in accordance with some embodiments also base the decision that an accident event has occurred on valve activity and or on a position signal. More detailed examples illustrating how such signals can be used are illustrated and described in conjunction with FIGS. 8-11 below. In response to determining an accident event the controller can be configured to apply a predetermined setting for at least one air supply valve in a step 707.

An additional source of accident is movement of weight 22 upward or downward outside of a safe range. An example is an obstacle in the way of weight 22. Movement of weight 22 into an obstacle can give damage to obstacle, to the weight 22 or cause other accidents. To prevent this, the controller 5 can be configured with a range where weight 22 is allowed to move. In this case, controller 5 is configured to monitor the position of actuator using position sensor 13.

If position of actuator cylinder 14 is moved above (outside) allowed range, the controller 5 detects this using position sensor 13. The cylinder 14 is then forced back to be within the allowed range. For example, the valve 9 is closed and valve 10 is opened, this gives a reduction of pressure in chamber 16. As a result, weight 22 will move downward back to allowed range if the weight is above an allowed maximum height. In another scenario, If the position of actuator cylinder 14 is moved below allowed range, the controller 5 detects this using position sensor 13. The valve 9 can then be opened and the valve 10 can be closed, this gives an increase of pressure in chamber 16. As a result, weight 22 will move upward back to allowed range.

In accordance with some embodiments, the controller 5 can be configured to detect a negative pressure gradient of pressure B together with other input signals such as valve activity and or position signals to detect an accident event, such as if the weight 22 is dropped. FIGS. 8, 9, 10 and 11 illustrate different examples of operation of balancing actuator with weight 22 attached to actuator 14.

Figure 8:
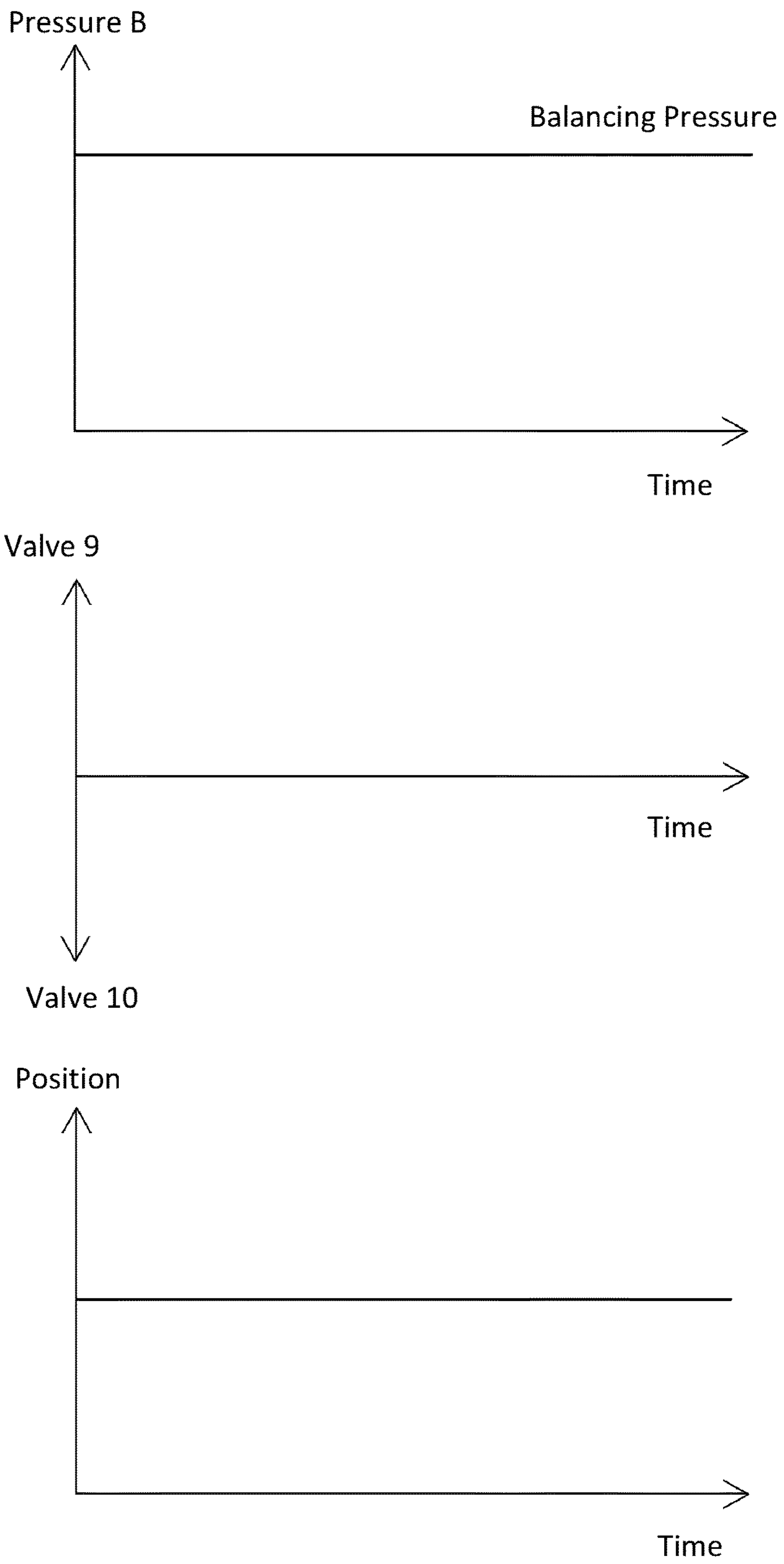
FIGS. 8-11 illustrate different exemplary events when operating a pneumatic balancing system.

FIG. 8 illustrates an example when weight 22 is balanced by the pressure B in chamber 16. No external force is applied to weight 22. As a result, pressure will be at a constant level, valve 9 and 10 are deactivated (closed) and position sensor 13 measures a constant position.

Figure 9:
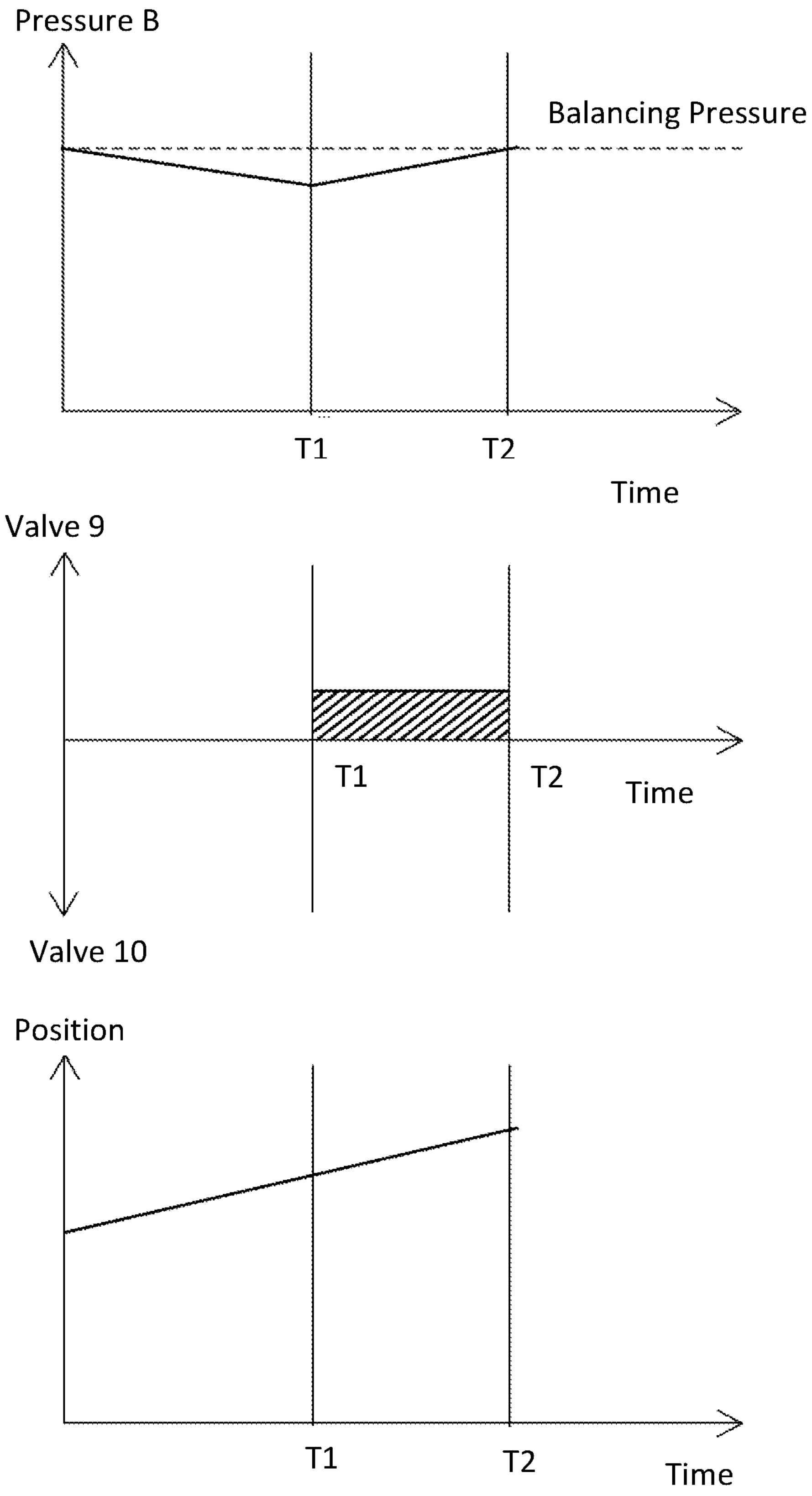

FIG. 9 illustrates an example when a force in upward direction is applied to weight 22 by an operator at time 0. Initially, pressure B will decrease as a result of the external force expanding chamber 16. At time T1, the decrease in pressure B is detected by controller 5 and valve 9 is activated to counteract the decrease in pressure B. Between time T1 and T2, the controller detects an increase in pressure B as a result of activation of valve 9. If position sensor 13 is connected to controller 5, a movement in upward direction is also detected.

Figure 10:
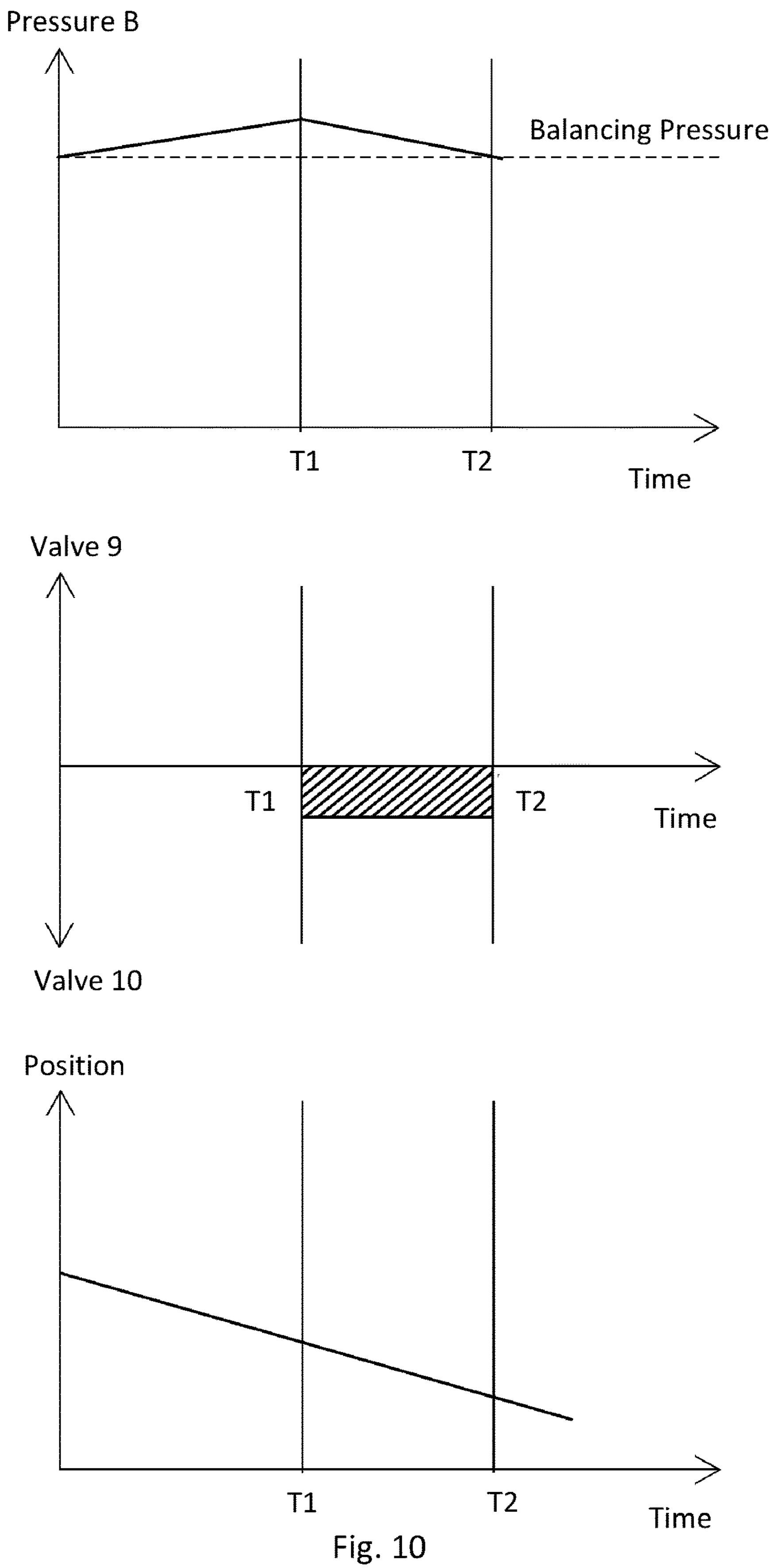

FIG. 10 illustrates when a force in downward direction is applied to weight 22 by an operator at time 0. Here, pressure B will increase as a result of chamber 16 being compressed by external force. At time T1, the increase in pressure B is detected by controller 5 and valve 10 is activated to counteract the increase in picture. Between time T1 and T2, the controller detects a decrease in pressure B as a result of activation of valve 10. If position sensor 13 is connected to controller 5, a movement in downward direction is also detected.

Figure 11:
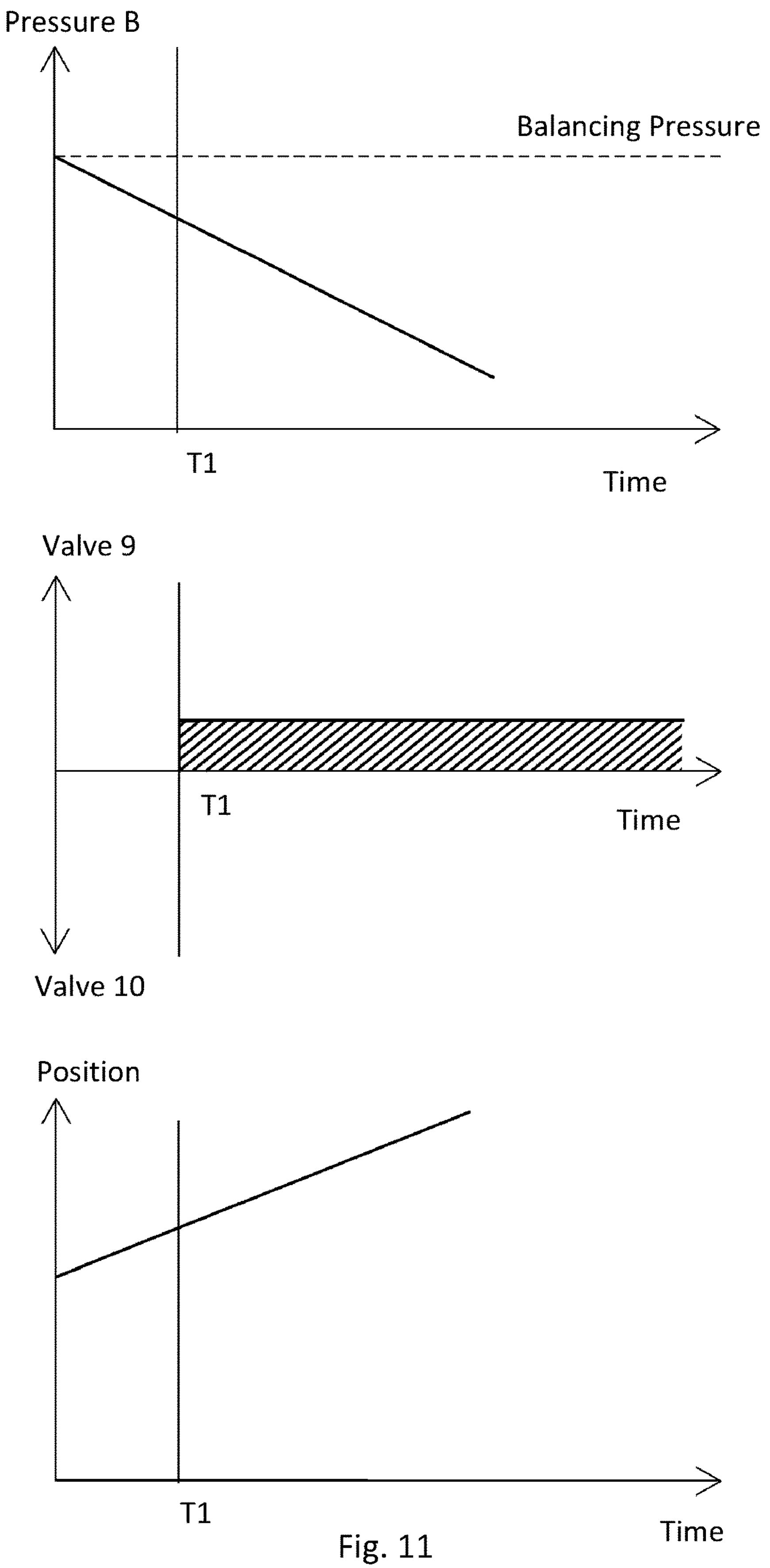

FIG. 11 illustrates an example when load 22 is dropped at time 0. As a result of this, described previously, the pressure B will decrease. The decrease is detected by controller 5 at time T1 and valve 9 is activated to counteract the decrease of pressure B. Since weight 22 is detached from actuator 14, instead of an increase in pressure B chamber 16 will expand further. After time T1, the controller detects a decrease in pressure B as a result of activation of valve 9. If position sensor 13 is connected to controller 5, a movement in upward direction is also detected.

In the example described in FIG. 11, a decrease in pressure is detected as a result to activation of valve 9. This is distinguishable from examples described in FIGS. 9 and 10, where activation of valve 9 results in an increase in pressure B and activation of valve 10 results in a decrease in pressure B Hence, the activity of the valve 9 can be used to improve the determination of an accident event such as the dropping of a weight.

Further, in example described in FIG. 11, a movement in upward direction is detected by position sensor 13 in combination with pressure B lower than balancing pressure. This is distinguishable from examples in FIGS. 9 and 10, where pressure B higher than balancing pressure gives movement in upward direction and pressure B lower than balancing pressure gives movement in downward direction. Hence, the reading from the position sensor can be used to improve the determination of an accident event such as the dropping of a weight.

Further, FIG. 6 illustrates a threshold value for pressure B. Detached load is detected when pressure is lower than the threshold value. The threshold value is typically chosen so that noise and normal operation of the system will not trigger a determination that the pressure is decreased. A further advantage of coupling a negative gradient of pressure B together with activation of valve 9 is that controller 5 can detect a dropped weight before pressure is lower than threshold value in FIG. 6. Thus, if a valve signal is used together with a pressure signal to determine an alarm event such as a dropped weight. The system can be made to react faster to such accidents events. Similarly, by coupling movement in upward direction in combination with pressure B lower than balancing pressure enables controller 5 to detect a dropped weight 22 before pressure is lower than threshold value in FIG. 6.

The invention claimed is:

1. A pneumatic load balancing system comprising:

an actuating cylinder for balancing a load, a pressure sensor for determining pressure in a chamber of the actuating cylinder, a position sensor to determine a position of the actuating cylinder, a controller configured to control air pressure in the chamber of the actuating cylinder via at least one air supply valve, wherein the controller is further configured to:

continuously or periodically obtain a current air pressure in the chamber from the pressure sensor, determine a decrease in pressure to a pressure below a balancing pressure, apply a predetermined setting based on a position obtained from the position sensor, detect that an accident event has occurred based on the determined decrease in pressure, store the position of the actuating cylinder when the accident event is detected, and control the position of the actuating cylinder to the stored position.

2. The pneumatic load balancing system according to claim 1, wherein the pressure in the chamber is first set to an initial value before starting to continuously or periodically obtain a current air pressure in the chamber.

3. The pneumatic load balancing system according to claim 2, wherein the initial value is set to ambient pressure.

4. The pneumatic load balancing system according to claim 1, wherein the pneumatic load balancing system is configured to supply air at a constant rate when supplying air to the chamber.

5. The pneumatic load balancing system according to claim 1, wherein the controller is configured to use an output signal of the position sensor to determine a balancing pressure.

6. The pneumatic load balancing system according to claim 1, wherein the pneumatic load balancing system is configured to initiate a load balancing sequence based on an initiation signal.

7. The pneumatic load balancing system according to claim 6, wherein the initiation signal is a user command signal.

8. A method in a pneumatic load balancing system, the system comprising an actuating cylinder for balancing a load, a pressure sensor for determining pressure in a chamber of the actuating cylinder, a position sensor to determine a position of the actuating cylinder, a controller for controlling air pressure in the chamber of the actuating cylinder via at least one air supply valve, wherein the method comprises:

continuously or periodically obtaining a current air pressure in the chamber from the pressure sensor, determining a decrease in pressure to a pressure below a balancing pressure, applying a predetermined setting based on a position obtained from the position sensor, detecting that an accident event has occurred based on the determined decrease in pressure, storing the position of the actuating cylinder when the accident event is detected, and controlling the position of the actuating cylinder to the stored position.

9. The method according to claim 8, wherein the pressure in the chamber is first set to an initial value before starting to continuously or periodically obtain a current air pressure in the chamber.

10. The method according to claim 9, wherein the initial value is set to ambient pressure.

11. A pneumatic load balancing system comprising:

an actuating cylinder for balancing a load connected to the actuating cylinder, a balancing pressure, a pressure sensor for determining pressure in a chamber of the actuating cylinder, a position sensor to determine a position of the actuating cylinder, and a controller configured to control air pressure in the chamber of the actuating cylinder via at least one air supply valve, wherein the controller is further configured to:

continuously or periodically obtain a current air pressure in the chamber from the pressure sensor, determine a decrease in pressure to a pressure below the balancing pressure, and determine that an accident event has occurred based on the determined decrease in pressure and an output signal of the position sensor.

12. The pneumatic load balancing system according to claim 11, wherein activity of the at least one air supply valve is continuously or periodically monitored and where the controller is configured to determine that an accident event has occurred based on the determined decrease in pressure and valve activity.

13. The pneumatic load balancing system according to claim 11, wherein the accident event is determined to be a load being detached from the actuating cylinder.

14. The pneumatic load balancing system according to claim 11, wherein the controller is configured to apply a predetermined setting for at least one air supply valve when an accident event has been determined.

15. The pneumatic load balancing system according to claim 14, wherein the predetermined setting comprises to close a valve used for increasing the balancing pressure.

16. The pneumatic load balancing system according to claim 14, wherein the predetermined setting comprises to open a valve used for decreasing the balancing pressure.

17. The pneumatic load balancing system according to claim 11, wherein the controller is configured to determine a decrease in pressure to a pressure below balancing pressure when the pressure is below a preset threshold value.

18. The pneumatic load balancing system according to claim 11, wherein when the controller is configured to apply a predetermined setting based on a position obtained from a position sensor, and wherein the controller is configured to:

store the position of the actuating cylinder, when the accident event is detected, and control the position of the actuating cylinder to the stored position.

19. The pneumatic load balancing system according to claim 11, wherein the controller is configured to continuously or periodically obtain the position of the actuating cylinder using the output signal from the position sensor, determine if the actuating cylinder is outside an allowed range when it is determined that the actuating cylinder is outside the allowed range drive the actuating cylinder towards the allowed range.

* * * * *